United States Patent
Drwiega et al.

(10) Patent No.: US 6,842,463 B1
(45) Date of Patent: Jan. 11, 2005

(54) AUTOMATED AND ADAPTIVE MANAGEMENT OF BANDWIDTH CAPACITY IN TELECOMMUNICATIONS NETWORKS

(75) Inventors: Tadeusz J. Drwiega, Kanata (CA); James J. Yan, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 731 days.

(21) Appl. No.: 09/617,232

(22) Filed: Jul. 14, 2000

(51) Int. Cl.$^7$ .................................................. H04J 3/16
(52) U.S. Cl. .................. 370/468; 370/235; 370/395.21; 370/395.41
(58) Field of Search ................................. 370/229–238, 370/252–258, 389–392, 395.1, 396–397, 418–422, 400–409; 709/105, 220, 222, 238

(56) References Cited

U.S. PATENT DOCUMENTS

| | | | | |
|---|---|---|---|---|
| 5,583,860 A | * | 12/1996 | Iwakawa et al. | 370/232 |
| 5,787,271 A | * | 7/1998 | Box et al. | 714/4 |
| 5,933,425 A | * | 8/1999 | Iwata | 370/351 |
| 6,011,776 A | * | 1/2000 | Berthaud et al. | 370/232 |
| 6,118,791 A | * | 9/2000 | Fichou et al. | 370/468 |
| 6,240,463 B1 | * | 5/2001 | Benmohamed et al. | 709/238 |
| 6,252,857 B1 | * | 6/2001 | Fendick et al. | 370/254 |
| 6,256,309 B1 | * | 7/2001 | Daley et al. | 370/395.43 |
| 6,285,658 B1 | * | 9/2001 | Packer | 370/230 |
| 6,301,267 B1 | * | 10/2001 | Ben-Ami | 370/468 |
| 6,353,616 B1 | * | 3/2002 | Elwalid et al. | 370/443 |
| 6,377,546 B1 | * | 4/2002 | Guerin et al. | 370/230 |
| 6,404,735 B1 | * | 6/2002 | Beshai et al. | 370/230 |
| 6,442,138 B1 | * | 8/2002 | Yin et al. | 370/232 |
| 6,469,982 B1 | * | 10/2002 | Henrion et al. | 370/230 |
| 6,556,544 B1 | * | 4/2003 | Lee | 370/256 |
| 6,563,793 B1 | * | 5/2003 | Golden et al. | 370/236 |
| 6,577,653 B1 | * | 6/2003 | Rochberger et al. | 370/536 |
| 6,590,867 B1 | * | 7/2003 | Ash et al. | 370/236 |
| 6,628,618 B1 | * | 9/2003 | Cinkler | 370/238 |
| 6,631,134 B1 | * | 10/2003 | Zadikian et al. | 370/395.21 |
| 6,633,544 B1 | * | 10/2003 | Rexford et al. | 370/238 |

* cited by examiner

Primary Examiner—Kenneth Vanderpuye
Assistant Examiner—Van Nguyen (57) ABSTRACT

Management of the bandwidth capacity of tunnels through a network may be automated such that the network is adaptive to the stochastic nature of incoming traffic. An edge node in the network includes four main elements. Three of the elements, namely tunnel signaling, admission control and path selection, are derived from known technologies, generalized from their particular technologies and enhanced. With the addition of a fourth element, called capacity management, the four elements cooperate to accommodate the capacity needs of the traffic incoming to the network at the edge node. This accommodation is performed by estimating the traffic demand and dynamically adapting tunnels to the traffic demand.

11 Claims, 8 Drawing Sheets

AUTOMATED AND ADAPTIVE MANAGEMENT OF BANDWIDTH CAPACITY IN TELECOMMUNICATIONS NETWORKS

FIELD OF THE INVENTION

The present invention relates to telecommunications networks and, in particular, automated and adaptive management of bandwidth capacity in such networks.

BACKGROUND OF THE INVENTION

Network planning may be described as the optimized selection of alternative paths through a given network to meet estimates of traffic demand on the network and other operational constraints such as delay and reliability. Reliable traffic demand estimation is therefore a critical step in the network planning process. In telephone networks that cater to a single dominant traffic type, namely voice, the traditional process of off-line traffic forecasting, where a forecast is fed into an off-line network planning process, has proven to be effective. Such an approach to traffic demand estimation uses well established voice traffic models to predict traffic demand within acceptable accuracy limits. The growth rate of traffic demand in telephone networks has traditionally allowed a cycle of network measurement, analysis, forecasting, network planning and deployment to occur over weeks, even months.

With the explosive growth of Internet traffic, the use of Internet protocol (IP) networks for real-time services (Voice over IP, video conferencing) and mission-critical applications and the emergence of e-commerce, data traffic volume has surpassed voice traffic volume and is expected to grow at a much higher rate. Network operators have shifted their planning focus to data-centric network infrastructures that can support a wide range of applications, including voice, scale well with the growth of data traffic and adapt quickly to new market needs. The networks resulting from this shift in planning focus are, at the same time, required to be dependable. That is, the resulting networks preferably provide performance, availability and security equivalent to telephone networks. In such a volatile environment, one of the key challenges to network planners is specification, with sufficient confidence, of the characteristics, demand and rate of growth of data traffic. The data traffic may arise from a wide range of known applications as well as data traffic arising from novel applications. Unfortunately, this specification is required in an environment with little or no historical data. Further, business requirements for these new networks include minimization of time to market, network capacity growth faster than growth of customer base and rapid accommodation of factors unknown during pre-deployment planning.

Typical networks comprises nodes and links between the nodes. Further, connections exist from so-called edge nodes within the network of interest to networks external to the network of interest. Often, a network will be called upon to provide a path from one edge node to another edge node, to connect two external networks. Such a path may be set up at an edge node, responsive to a request for service from a node in an external network, and comprise at least one link between nodes in the network of interest. The request for service may include a requirement for a certain Quality of Service (QoS) relating to path characteristics like bandwidth and delay. At the edge node, once a path which satisfies the request is determined, capacity may be reserved in links along that path. A tunnel, as used herein, refers to an edge-to-edge logical path with capacity, reserved on each link in the path, sufficient to provide QoS guarantees.

Existing networking technologies involve such functions as tunnel signaling, path selection and admission control. Network nodes use tunnel signaling to establish tunnels, reserve capacity for tunnels, modify reserved capacity or tear tunnels down. Known network architectures include such examples of tunnels as Virtual Paths in Asynchronous Transfer Mode (ATM), Label Switched Paths in Multi-Protocol Label Switching (MPLS) and optical paths in Wavelength Division Multiplexing (WDM). Examples of Tunnel Signaling include Constrained Routing Label Distribution Protocol (CRLDP) and Resource Reservation Signaling Protocol (RSVP).

Paths for tunnels can be selected with or without human intervention. A network operator may select a path for a tunnel or, given appropriate path selection intelligence, a path for a tunnel may be selected by an edge node or a network management node. The capability of a network to select paths for its tunnels is fundamental to automated network capacity management. Such a path selection capability in known networks is exemplified by the Private Network-Network Interface (PNNI) standard in use in ATM networks or the Open Shortest Path First (OSPF) standard in use in IP networks. Using either PNNI or OSPF, a network node may generate a routing table, comprising a list of paths to each other node in the network, that can be used to select paths for tunnels. Path selection however, is not necessarily limited to those routing tables. It is possible to use the information obtained via OSPF, with regard to network capacity and its utilization, to select paths different than those in the routing tables.

Once a tunnel is created, it may be used by a number of connections. Subsequent to a request for a connection through a network being directed to an appropriate tunnel, the connection is typically examined by Admission Control (AC), which allows only as much traffic as the tunnel can accommodate within its capacity. The AC rejects a connection if the connection would increase the traffic carried by a tunnel beyond the tunnel capacity. AC is currently implemented in ATM networks as Call Admission Control (CAC), but it can be adapted to other types of tunnels.

Work on an adaptive and automated capacity management has so far concentrated on capacity adjustment for virtual paths, resulting in a number of approaches (see H. Saito, "Dynamic Resource Allocation in ATM Networks", IEEE Communications Magazine, May 1997 and A. S. Maunder, P. S. Min, "Dynamic Bandwidth Allocation to Virtual Paths", International Conference on Performance, Computing and Communication—IPCCC '98), which use CAC to monitor traffic carried by virtual paths and modify their capacity if it is not adequate. They differ from each other by the assumptions made about the traffic, the traffic models used, the estimators of capacity needs of the traffic and the triggers for modifying virtual path capacity. A further proposal, described in S. Shioda, H. Toyoizumi, H. Yokoi, "Self-Sizing Network: A New Network Concept Based on Autonomous VP Bandwidth Adjustment", International Tele-traffic Congress ITC 15, Washington, D.C., 1997, includes the calls rejected by the CAC into an estimated capacity requirement for each virtual path. These approaches are, unfortunately, limited to ATM networks.

A different approach is taken in M. Chatzaki, S. Sartzetakis, N. Papadakis, C. Courcoubetis, "Resource Allocation in Multi-service MPLS", 7$^{th}$ International Workshop on QoS, London, England, 1999. The authors describe a solution for an automated management of capacity in MPLS networks wherein the capacity of each link in the network is divided between different classes of service. By doing this, a virtual network is created for each class of service. Each virtual network has its own routing, which is independent of the routing in the other virtual networks. The routing directs new calls to the least utilized routes. When a virtual link, i.e. a part of a link assigned to a particular class of service, becomes congested, it is given more capacity at the expense of the other virtual links. This approach is also limited to a specific type of network, namely Multi-service MPLS.

Consequently, a need exists for a adaptive and automated capacity management approach applicable to a broad range of network types. Further, the approach should address the dual traffic management problems facing network operators. First, that the revenues of installed network capacity are to be maximized while meeting the QoS needs of unpredictable traffic and second, that the network capacity is to be increased with minimum time and overhead costs.

SUMMARY OF THE INVENTION

In the present invention, tunnel-based network architectures are exploited for use in high-capacity networks. A system and a set of algorithms allow changes in tunnel capacity or tunnel paths to adapt to new traffic demands estimated via network measurements. The system includes such elements as a tunnel signaler, an admission controller, a path selector and a capacity manager. Advantageously, the set of algorithms are applicable to a broad range of network types. Further advantages of the present invention include its dynamism. That is, the system acts in a near-real time mode, based on measurements and information exchange within and between network nodes. Additionally, although the capacity manager and the path selector make decisions locally, the decisions are based on the network-wide information and they have network-wide consequences, i.e. tunnels selected, or modified by the decisions change bandwidth allocation in the network links. As well, the system may be applied at all levels of a network, allowing for a very fast and efficient bandwidth management, as compared to individual and independent bandwidth management at each level.

In accordance with an aspect of the present invention there is provided a method for changing a reserved capacity for a given tunnel, including receiving an indication of traffic demand for a tunnel through a network and, based on the received indication, determining an estimated total capacity requirement. The method further includes comparing the estimated total capacity requirement to the reserved capacity and, where the estimated total capacity requirement exceeds the reserved capacity, requesting an increase of the reserved capacity. In another aspect of the invention a system for automated adjustment of a reserved capacity for a tunnel through a network including a tunnel signaler, an admission controller, a path selector and a capacity manager for performing this method. In a further aspect of the present invention, there is provided a software medium that permits a general purpose computer to carry out this method.

In accordance with a further aspect of the present invention there is provided a method of selecting a path from a source node to a destination node including labeling the source node and assigning a value to a reported bandwidth associated with each of a plurality of unlabeled nodes where, if an unlabeled node has a link from the source node, the reported bandwidth is assigned a value based on a bandwidth of the link from the source node, otherwise the reported bandwidth is assigned a value of zero. The method further includes, until the destination node is labeled, selecting a next node, among the plurality of unlabeled nodes, having a maximum reported bandwidth value, labeling the next node, processing nodes connected to the next node to reassign corresponding reported bandwidth values and, where the next node is the destination node, selecting a path from the source node to the destination node corresponding to the maximum reported bandwidth value associated with the next node.

In accordance with another aspect of the present invention there is provided a data structure for use in communicating information regarding traffic demand for a tunnel including an indication of tunnel capacity in use and an indication of total capacity refused admission to the tunnel. Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION OF THE PREFERRED EMBODIMENTS

Figure 1:
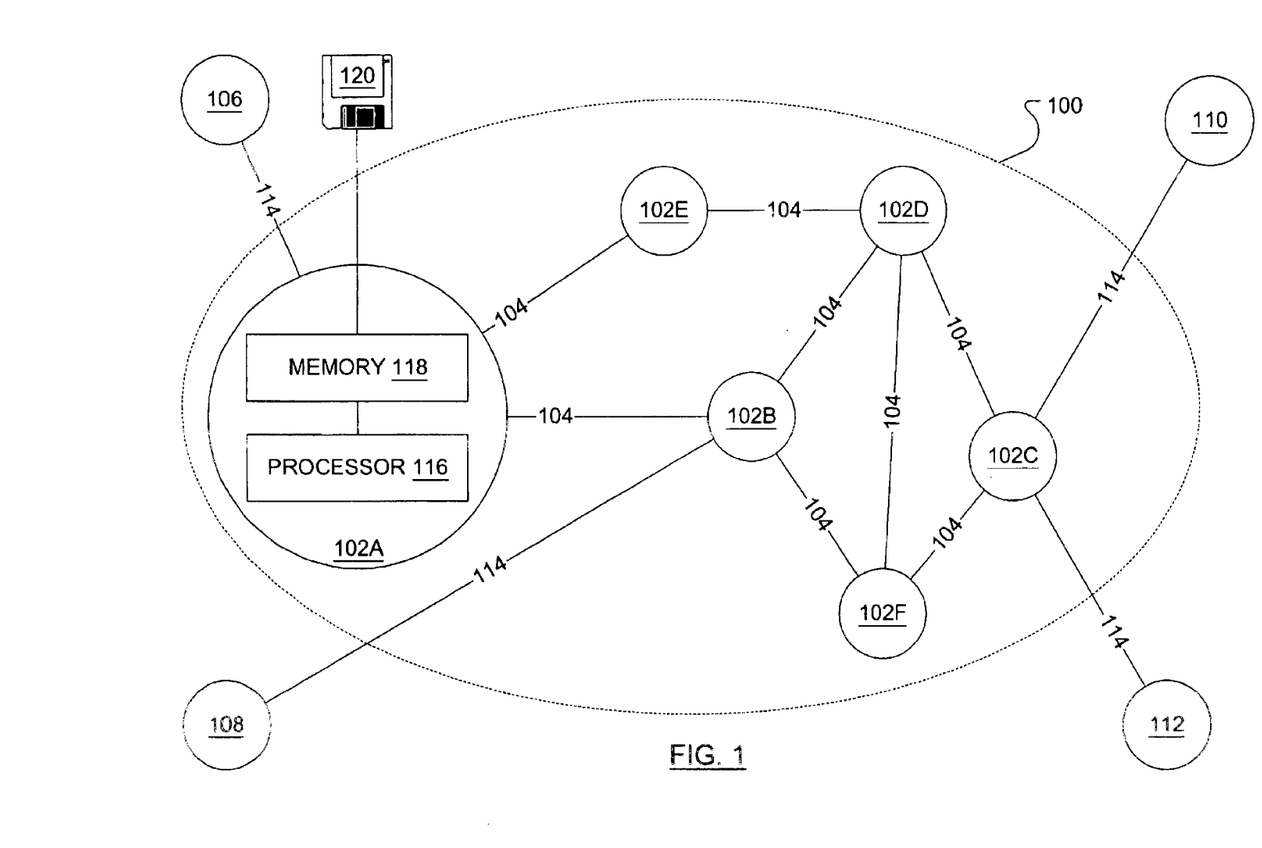
FIG. 1 illustrates a schematic network of nodes representing a communications network.

FIG. 1 illustrates a network 100, suitable for use with the present invention, comprising a plurality of nodes 102 and network links 104 between the nodes 102. Particular ones 102A, 102B, 102C of the nodes 102 serve as "edge nodes" connecting to nodes 106, 108, 110, 112 in external (or higher layer) networks over connections 114. Other ones 102D, 102E, 102F of the nodes 102 serve as "core nodes" connecting only to nodes 102 within network 100. Node 102A is shown to include a memory 118 and a processor 116 loaded with capacity management software for executing methods exemplary of the present invention from software medium 120. Software medium 120 may be a disk, a tape, a chip or a random access memory containing a file downloaded from a remote source.

Figure 2:
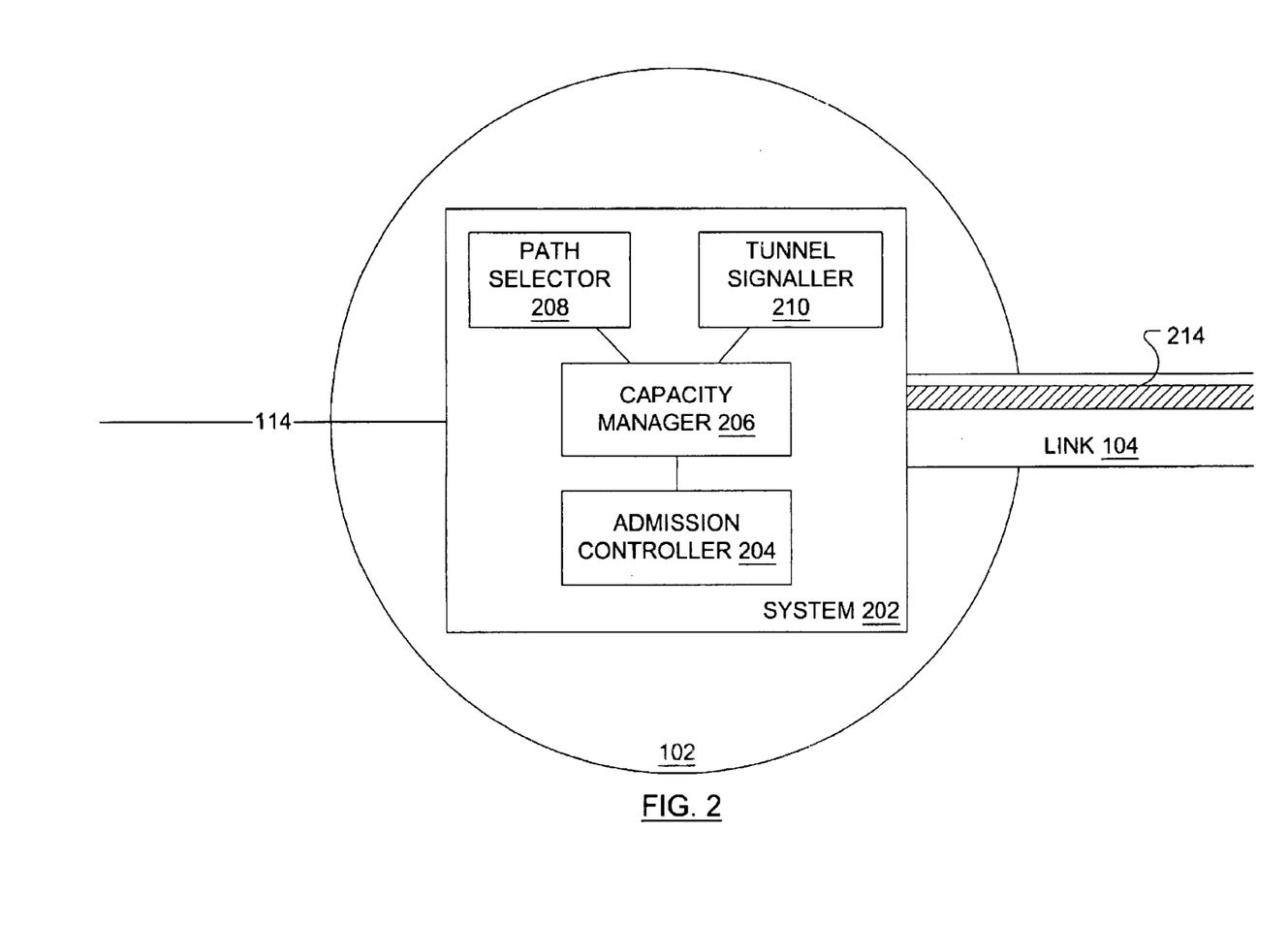
FIG. 2 illustrates elements of a single node in the network of FIG. 1 in accordance with an embodiment of the present invention.

Components of a system 202 as part of an exemplary edge node 102 are illustrated in FIG. 2, where the system 202 is used for automated adjustment of a reserved capacity in a tunnel. An admission controller 204 receives, over the connection 114, requests for service from nodes in external networks (not shown) and communicates with a capacity manager 206. The capacity manager 206 maintains communication with both a path selector 208 and a tunnel signaler 210. Both the path selector 208 and the tunnel signaler 210 may exchange information with other nodes (not shown) within the network 100, over the network link 104. A tunnel 214 is schematically shown as occupying a portion of the available capacity of the network link 104. Once the tunnel 214 is set up over a path, data may flow over that path as directed by the admission controller 204.

Figure 3:
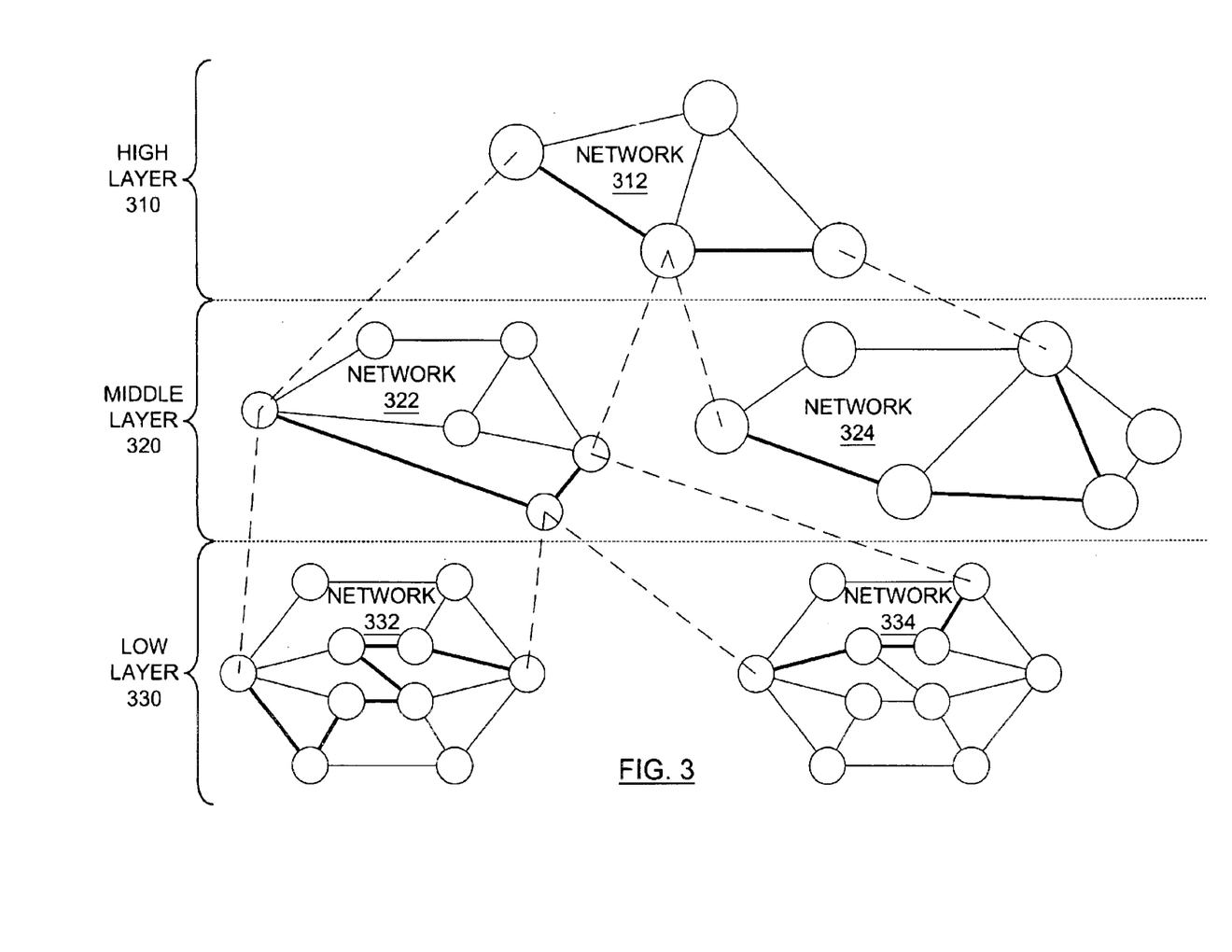
FIG. 3 illustrates an exemplary hierarchy of network layers indicating correspondence between links and tunnels.

The notion of network layers is illustrated in FIG. 3. A high layer 310 is illustrated as being higher than a middle layer 320 which, in turn, is higher than a low layer 330. In particular, each link in a tunnel (represented by the heavier lines) through a network 312 in the high layer 310 may be seen to comprise a corresponding tunnel through a network (322 and 324) in the middle layer 320. Similarly, each link in a tunnel (represented by the heavier lines) through a network 322 in the middle layer 320 may be seen to comprise a corresponding tunnel through a network (332 and 334) in the low layer 330.

In overview, management of the capacity of the network 100 may be automated such that the network 100 is adaptive to the stochastic nature of incoming traffic. An edge node includes four main elements. Three of the elements, namely tunnel signaling, admission control and path selection, are derived from known technologies, generalized from their particular technologies and enhanced as hereinafter discussed. With the addition of a fourth element, called capacity management, the four elements cooperate to accommodate the capacity needs of the traffic incoming to the network at the edge node. This accommodation is performed by estimating the traffic demand and dynamically adapting tunnels to the traffic demand.

Tunnels are set up to serve requests for service, e.g. requests for communication between edge nodes. Depending on the network architecture, requests for service can be requests for Virtual Circuits, calls, sessions or requests for reservation of a specific amount of capacity. A network administrator may decide that all requests for service from a first given node to a second given node should be served by a single tunnel, or the network administrator can define different classes of service and require that requests for service of differing classes be served by separate tunnels.

Turning to FIG. 2, the admission controller 204 monitors the amount of traffic carried by each tunnel and the capacity required by new requests for service. The information gathered from this monitoring is used to determine whether to admit new requests for service. Where known CAC methods either admit or reject new requests, the admission controller 204 can admit or reject new requests and also negotiate an admission. If available capacity on the current tunnel is insufficient to accommodate a connection request, the admission controller 204 sends an indication of the available capacity to the originator of the request. The originator may then decide to lower the capacity requirement of the request, abandon the request or delay the request to a later time.

The admission controller 204 periodically passes tunnel-specific information to the capacity manager 206 including an indication of the tunnel capacity in use by serviced requests and an indication of total capacity not admitted to the tunnel. The capacity manager 206 uses the tunnel-specific information to determine whether the tunnels have adequate reserved capacity.

The capacity in use by serviced requests may be determined by the admission controller 204 either from the individual requirements specified by the serviced requests, or from measurements of the volume of traffic corresponding to particular serviced requests. Any admission control method that monitors traffic of serviced requests and obtains, or estimates, capacity requirements of requests for service can be used. A number of Call Admission Controls, which provide such functions have been proposed for ATM. For example, methods described in S. Floyd, "Comments on Measurement-based Admission Control for Controlled-Load Services", Lawrence Berkeley National Laboratory, July 1996 and S. Jamin, S. J. Shenker, P. B. Danzig, "Comparison of Measurement-Based Control Algorithms for Controlled-Load Service", Proc. of IEEE Infocom '97 (both publications hereby incorporated herein by reference) are valid choices.

In some types of traffic, requests for service do not specify capacity requirement. An example is the Unspecified Bandwidth Requirement (UBR) class in ATM. For those traffic types, the admission controller 204 does not make admission decisions for new requests for service and every session request is admitted. This is done for two reasons. First, if the bandwidth requirement of a session is not known, the admission controller 204 cannot decide whether the tunnel can carry the traffic generated by the session. Second, such sessions belong to a class of traffic which does not receive any guarantees on the quality of service and, therefore, can be packed to a tunnel that is highly utilized. The sessions may suffer long delays and/or high packet losses, but the data carried in such sessions are typically not sensitive to such quality of service degradation. For those types of traffic, the admission controller 204 may estimate only the capacity required by the carried traffic but not the rejected capacity requirements.

The path selector 208 has access to information about the topology of the network 100, on the capacity of each network link 104, and on the amount of capacity on each network link 104 reserved by the tunnels that use each network link 104. One known method by which the path selector 208 obtains this information, used in MPLS networking, is called Link State Advertisements. The path selector 208 uses the information from the network 100 and the information passed by the capacity manager 206 to select a path from a source node to a destination node (as described hereafter, such a path may be used to create a tunnel between these nodes). There are a number of possible methods that the path selector 208 may use to select a path. However, whichever path selection method is chosen, the chosen path selection method must be capable of finding a path with at least a specified capacity.

If the path selector 208 finds a path, which has enough available capacity on each link to accommodate an estimated total capacity requirement for a given tunnel, the path selector 208 sends a description of that path to the capacity manager 206. If there is no path that has enough available capacity, the path selector 208 finds the path with the maximum available capacity, and passes a description of the maximum capacity path to the capacity manager 206 along with an indication of the maximum available capacity on the maximum capacity path. A path description is a sequence of hops, which uniquely defines a path through a network.

One of the tasks performed by the capacity manager 206 is the determination of an estimate of the capacity requirement of a given tunnel. If the estimated total capacity requirement is greater than the reserved capacity for the given tunnel, the capacity manager 206 may determine that capacity of the given tunnel should be increased. To avoid frequent changes to the reserved capacity, the capacity manager 206 preferably acts to increase the reserved capacity to a value greater than the estimated total capacity requirement. If the estimated total capacity requirement is less than the reserved capacity, the capacity manager 206 may make a determination that the reserved capacity should be decreased. To avoid frequent changes to the reserved capacity, the capacity manager 206 preferably makes the determination only if the estimated total capacity requirement is significantly less than the reserved capacity. If the estimated total capacity requirement is less than the reserved capacity, but not significantly less, the capacity manager 206 may determine that the reserved capacity should not be modified. The details of the method by which the capacity manager 206 estimates a capacity requirement for a tunnel, the amount of capacity by which to change reserved capacity and the meaning of "significantly less" are provided hereinafter.

Figure 4:
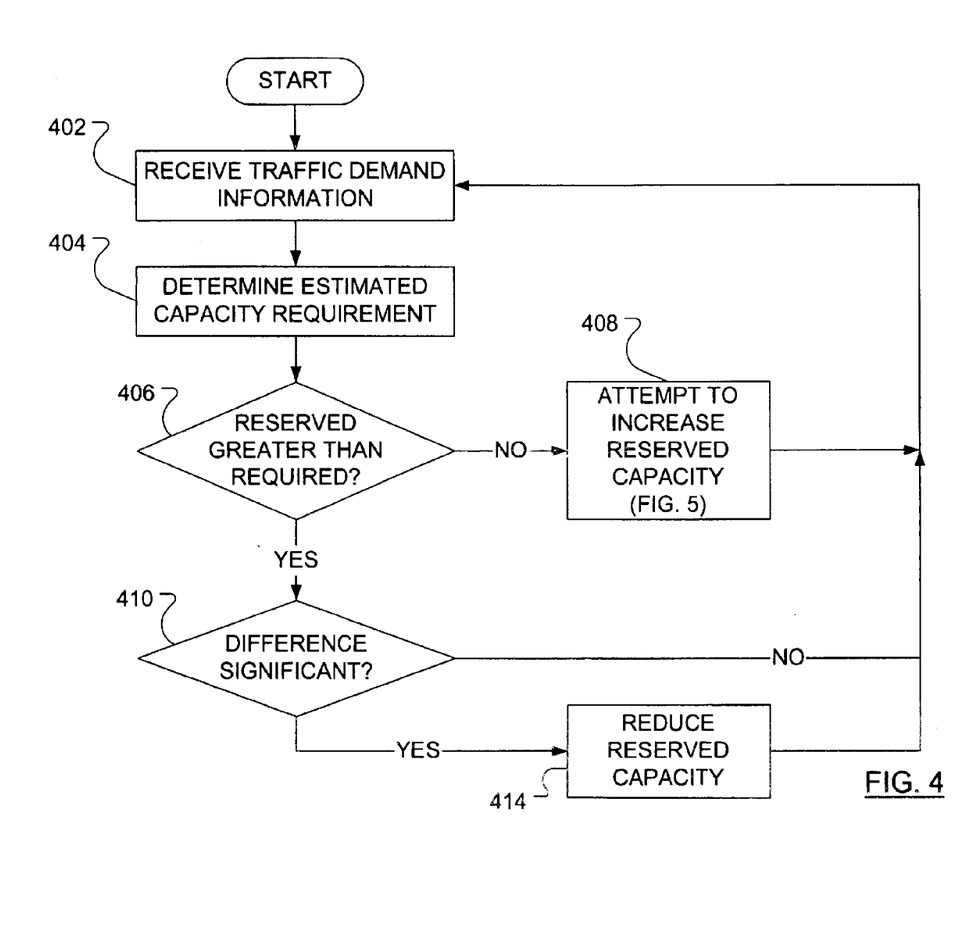
FIG. 4 illustrates steps of an adaptive capacity management method in accordance with an embodiment of the present invention.

Turning to FIG. 4, a method, carried out at the capacity manager 206, for adapting the reserved capacity of a tunnel to requirements of incoming traffic begins with receipt of an indication of traffic demand on a given tunnel (step 402). The capacity manager 206 uses the received indication of traffic demand to determine an estimated total capacity requirement (step 404). The estimated total capacity requirement is then compared to the reserved capacity for the given tunnel (step 406). If the reserved capacity is greater than the estimated total capacity requirement, it is further determined whether the difference is significant (step 410), and, if so, the amount of reserved capacity is reduced (step 414). If the reserved capacity is less than the estimated total capacity requirement, an attempt is made to increase the capacity of the given tunnel (step 408). The dynamism of the system 202 is related to a rate at which indications of traffic demand are received by the capacity manager 206. If the indications are received frequently enough, the system 202 may act in a near-real time mode, decreasing or increasing tunnel capacity almost as soon as traffic demand changes.

When the capacity manager 206 determines that the reserved capacity for a given tunnel should be decreased to an estimated total capacity requirement (step 414), the capacity manager 206 indicates the value of the estimated total capacity requirement to the tunnel signaler 210. The tunnel signaler 210 sends messages to all the nodes 102 along the path of given tunnel reserving the new, smaller amount of capacity.

Each change made in the reserved capacity for a given tunnel, i.e. either an increase (step 408) or a decrease (step 414), has consequences throughout the network 100. For instance, as a result of an increase in the reserved capacity for a tunnel between the edge node 102A and the edge node 102C, the edge node 102C may select a different path for a tunnel to the edge node 102B than would have been selected before the increase.

Figure 5:
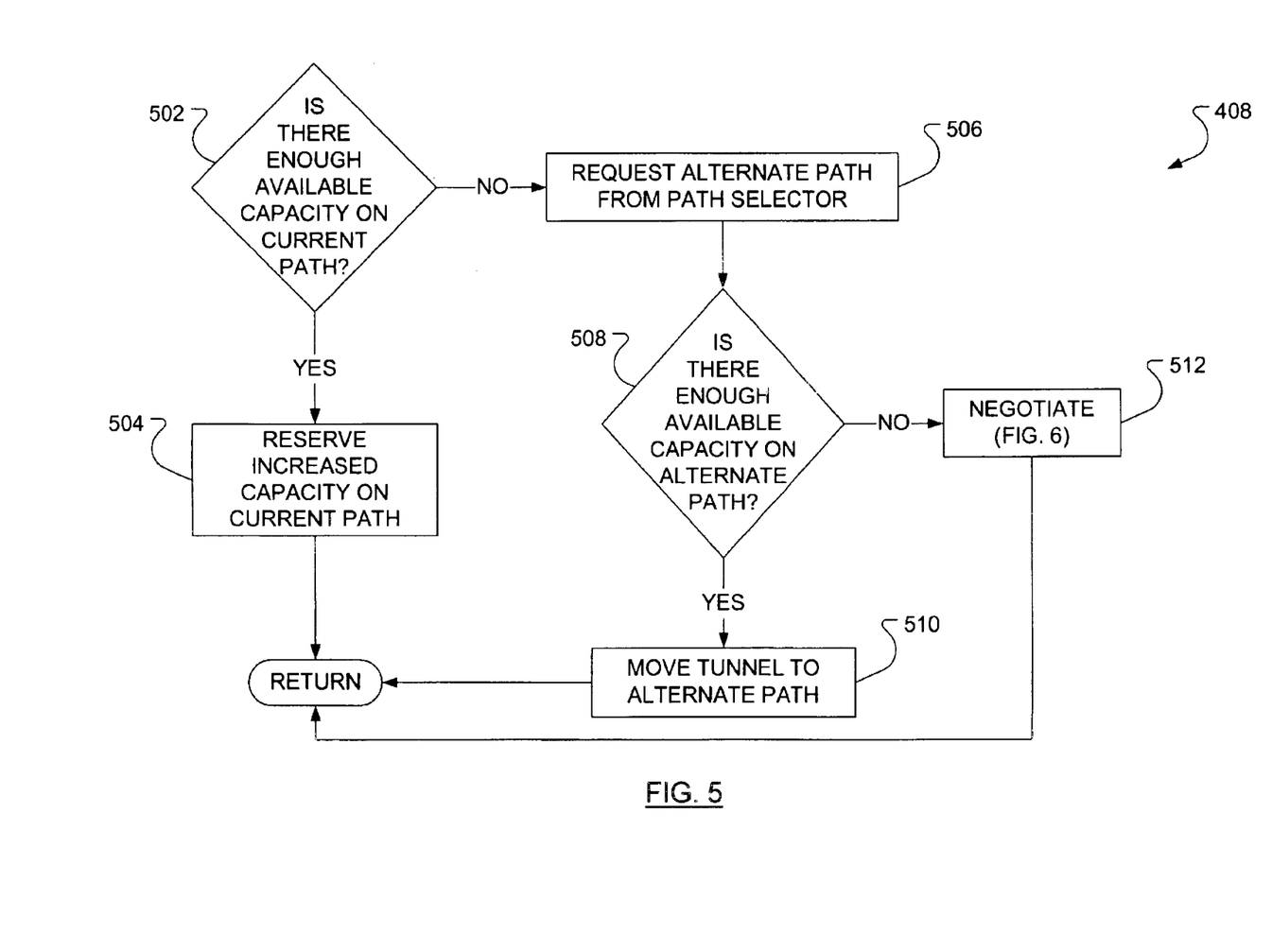
FIG. 5 illustrates steps of a reserved capacity increasing method in accordance with an embodiment of the present invention.

The first step in attempting to increase the capacity of the given tunnel, refer to FIG. 5, is to determine whether the current path for the given tunnel has sufficient available capacity so that the capacity of the given tunnel can be increased to the estimated total capacity requirement (step 502). To determine whether the current path has available capacity to accommodate the estimated total capacity requirement, the capacity manager 206 indicates the value of the estimated total capacity requirement to the tunnel signaler 210. The tunnel signaler 210 sends messages to all the nodes 102 along the current path of the given tunnel requesting the estimated total capacity requirement. If all the links in the path have available capacity, i.e. capacity not reserved by other tunnels, to accommodate the increase, each node replies to the tunnel signaler 210 indicating a reservation of the estimated total capacity requirement for the given tunnel. The increased capacity may then be reserved for the given tunnel (step 504). If any links on the path do not have available capacity to accommodate the increase, the amount of available capacity on these limiting links (called bottleneck links) is returned to the tunnel signaler 210 and the capacity increase request is considered to have been refused.

If the increase request is refused, the tunnel signaler 210 indicates the refusal to the capacity manager 206, identifies the bottleneck links and indicates the amount of available capacity on the bottleneck links. Upon receiving such a refusal, the capacity manager 206 sends a request to the path selector 208 (step 506) to find an alternative path for the given tunnel. In the request to the path selector 208, the capacity manager 206 provides an indication of the current path of the given tunnel, the current value of the reserved capacity for the given tunnel and the value of the estimated total capacity requirement. The path selector 208 returns a path through a network having an available capacity not less than the estimated requirement. If such a path does not exist, the path selector 208 returns the path through the network having the greatest available capacity.

Once the capacity manager 206 has received, from the path selector 208, an alternate path for the given tunnel, and the available capacity along the alternate path, the capacity manager 206 may determine whether the available capacity of the alternate path is sufficient to accommodate the estimated total capacity requirement (step 508).

If the alternate path has sufficient capacity, the capacity manager 206 acts to move the given tunnel to the alternate path (step 510). Movement of an existing tunnel to an alternate path first requires that the capacity manager 206 request that the tunnel signaler 210 reserve capacity along the alternate path.

If the alternate path has insufficient capacity to accommodate the estimated total capacity requirement, the capacity manager 206 may act to negotiate an increase in the capacity of the bottleneck link on the current path of the tunnel (step 512).

Figure 6:
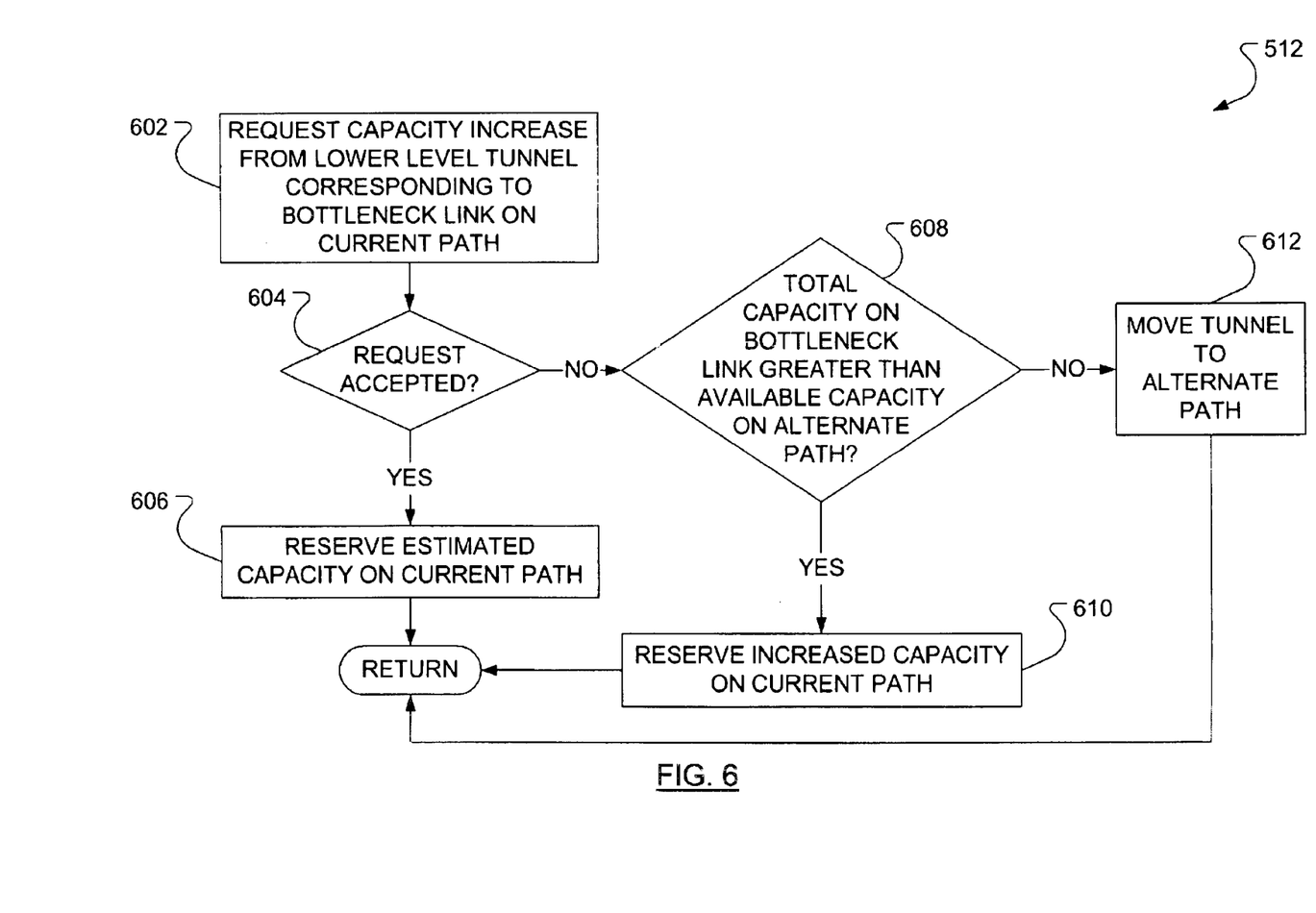
FIG. 6 illustrates steps of a capacity negotiation method in accordance with an embodiment of the present invention.

A method related to the negotiation of an increase in the capacity of a bottleneck link (step 512, FIG. 5) is illustrated in FIG. 6. If there is a tunnel-based layer providing network links 104 within network 100, the capacity manager 206 may send a request to the lower layer for an increase of the capacity of the bottleneck links (step 602). To request such an increase, the capacity manager 206 specifies the source and destination nodes of a given bottleneck link and an amount of the desired capacity increase. The request is received by an admission controller at a source node of a tunnel, in the lower layer, corresponding to the given bottleneck link. The admission controller at the source node treats such a request as a request for service, with a specification of required capacity, and proceeds as aforedescribed in relation to admission control. That is, if the admission controller in the lower layer determines that sufficient capacity is available, the request may be accepted. If the admission controller determines that sufficient capacity is not available, the request may be rejected or the amount of available capacity may be reported back to the capacity manager 206 so that a capacity increase may be negotiated.

If the admission controller in the lower layer accepts the request, as determined in step 604, the capacity of the given bottleneck link is considered to have been increased and an equivalent increase in the capacity of the rest of the links in the path of the given tunnel may then be reserved (step 606).

If the admission controller in the lower layer fails to accept the request, but instead offers to negotiate (i.e. if the admission controller in the lower layer can increase the capacity of the bottleneck link associated tunnel by less than the requested amount), the capacity manager 206 may compare the value of the total capacity available on the bottleneck link, as returned by the admission controller in the lower layer, to the value of the available capacity on the alternate path returned by the path selector 208 (step 608). If the value of the total available capacity on the bottleneck link is greater than the value of the available capacity on the alternate path, the capacity of the given bottleneck link is considered to have been increased and an equivalent increase in the capacity of the rest of the links in the path of the given tunnel may then be reserved (step 610). Otherwise, the capacity manager 206 proceeds as if the request was rejected and acts to move the given tunnel to the alternate path returned by the path selector (step 612). If the admission controller in the lower layer rejects the request, the available capacity on the bottleneck link is considered to be null for the purposes of step 608. The moving of the given tunnel is only necessary if the alternate path is different than the current path.

As may be clear from the above, where the system 202 (FIG. 2) is employed by nodes at all levels of a given network, the management of capacity can be very fast and efficient when compared to capacity management that is independent at each level.

Some networks may permit the establishment of a secondary tunnel between the same edge nodes of a network if the capacity of the given tunnel may not otherwise be increased to the level specified by the capacity manager 206. In such a network, it may be possible to have more than one tunnel accommodate service requests that would otherwise be accommodated by a single tunnel. Further, when the capacity of the given tunnel cannot be increased along the current path, the capacity manager 206 may determine whether there is a secondary tunnel to accommodate the same class of service. If such a secondary tunnel is present, the capacity manager 206 may request that the tunnel signaler 210 increase capacity of the given tunnel to the maximum available capacity on the current path. Next, the capacity manager 206 may request that the tunnel signaler 210 increase the capacity of the secondary tunnel by the balance of the capacity increase requested for the first tunnel, or to the maximum capacity available on the secondary tunnel, whichever is less.

If there is no other tunnel for that service class, the capacity manager 206 may attempt to move the given tunnel to another path. If the capacity manager 206 does not succeed in moving the given tunnel to another path, the capacity manager 206 may request that the tunnel signaler 210 increase the tunnel capacity along the current path to the maximum available capacity and, further, that the path selector 208 find an additional path for a secondary tunnel to accommodate the remainder of the requested capacity increase.

Finally, the capacity manager 206 may request that the tunnel signaler 210 establish an additional tunnel along the additional path returned by the path selector 208 with the required amount of capacity, or the maximum available capacity on the path, whichever is less. However, the establishment of more than one tunnel is likely to be unnecessary in high capacity networks, where single paths will satisfy most tunnel requirements for capacity. It may safely be assumed that in high capacity networks there will be no need to open more than one additional tunnel, i.e. requests that cannot be accommodated by a single tunnel are unlikely to require more than two tunnels.

When the capacity manager 206 determines that a decrease in the reserved capacity for a given tunnel is required (step 414, FIG. 4), a determination is made as to whether a secondary tunnel exists for serving the same class of requests between the same source and destination. If so, the capacity manager 206 further determines whether the total capacity required by both tunnels is less than the reserved capacity for one of the tunnels. If so, all future requests may be served by the tunnel whose reserved capacity exceeds the total capacity required by both tunnels and the other tunnel may be torn down.

Details of preferred algorithms for use by the capacity manager 206 when estimating the capacity required by a tunnel (step 404, FIG. 4), and when determining an amount by which to change the reserved capacity, follow.

The admission controller 204, in order to fulfill its role, maintains a record of the capacity used by serviced requests and by new requests for service. The admission controller 204 passes to the capacity manager 206 a parameter representing an estimate of the required capacity, $b_{est}$, and a rejected capacity parameter, $b_r$, for each tunnel. The estimated required capacity parameter, $b_{est}$, is based on capacity used by the serviced requests while the rejected capacity parameter, $b_r$, indicates the total capacity of requests for service that were rejected during a capacity update interval. The parameter $b_r$ preferably also takes into account the difference between originally requested capacity and a capacity settled on through negotiations.

The capacity required by a given request for service may be specified as part of the request, or calculated by the admission controller 204 from parameters provided by the request for service. Such parameter may include "mean rate", "peak rate" and "burst size". A conservative estimate of capacity requirement from these parameters is the peak rate indicated by a request.

For a given tunnel, the capacity used by serviced requests can be estimated as proposed in R. Guerin, H. Ahmadi, M. Naghishineh, "Equivalent Capacity and its Application to Bandwidth Allocation in High-Speed Networks", IEEE JSAC, vol. 9, no. 7, September 1991, hereby incorporated herein by reference. The estimation of capacity required by serviced requests in this estimation proposal is based on an assumption that the capacity used by the serviced requests has a normal distribution. This assumption is well justified when the volume of the used capacity is high, which is the case in high-capacity networks. Where $b_c$ is a representative of instantaneous capacity used by serviced requests, the estimation makes use of average used capacity, m, and of the standard deviation, σ, of the used capacity. The estimation, $b_{est}$, of required capacity may be calculated as $$b_{est} = m + \sigma\sqrt{-2\ln(d) - \ln(2\pi)} \qquad \text{Equation 1}$$

where d is the probability that instantaneous capacity used by serviced requests, $b_c$, will exceed $b_{est}$. The value of d is specified as a parameter related to the quality of service and is typically very small, in the order of $10^{-8}$ to $10^{-6}$, so that the estimation of the used capacity is almost always adequate for the requirements of service requests. The second component of the sum in Equation 1 is a margin included to accommodate variability of the capacity of serviced requests.

The capacity manager 206 may, upon receiving $b_{est}$ and $b_r$, calculate an estimated total capacity requirement $b_{total}$ for the given tunnel from $$b_{total} = b_{est} + b_r. \quad \text{Equation 2}$$

Equation 2 illustrates the addition of the rejected capacity parameter $b_r$ to the estimation of required capacity $b_{est}$. The parameter σ is maintained as a standard deviation of the estimated total capacity requirement $b_{total}$. This approximation of the standard deviation is justified as the rejected capacity is likely to be small relative to the used capacity in high-speed networks with adaptive capacity management.

The capacity manager 206 compares the total estimated total capacity requirement $b_{total}$ to the reserved capacity for the given tunnel $b_{res}$. If $b_{total}$ exceeds $b_{res}$ by a significant amount, then the capacity manager 206 may determine that an increase to the reserved capacity for the given tunnel is required. Requesting that the new reserved capacity, $b_{new}$, be set to $b_{total}$, i.e. only by as much as necessary to meet the current total capacity requirement, would be optimal for the utilization of the capacity by tunnels. However, this capacity increasing strategy may result in frequent changes to the reserved capacity. Frequent changes increase messaging overhead by the tunnel signaler 210, which decreases the efficiency of the utilization of network capacity. To limit the frequency of the changes to the tunnel capacity, the capacity manager 206 may request that the reserved capacity of the given tunnel be increased to a value greater than $b_{total}$. The given tunnel would then have more capacity than the estimated total capacity requirement, and would therefore be able to accommodate another increase in traffic volume without having to have the capacity increased further.

A network administrator may specify a share of tunnel capacity, f, to declare as a buffer for absorbing changes to the incoming traffic. The larger the value of f, the lower the frequency will be of requests for capacity changes. If $b_{total} > b_{res}$, the capacity manager 206 may determine that the reserved capacity for the given tunnel, $b_{res}$, should be increased to $$b_{new} = \frac{b_{total}}{1 - f}.$$

The amount of the buffer, $f \cdot b_{new}$, is not necessary to serve the observed traffic, but it is resewed in case the volume of traffic increases again in a short period of time. Although the buffer does not give a complete assurance that the reserved capacity for the given tunnel will need another increase after a short time, the buffer greatly reduces the likelihood of such an event.

When a tunnel has too little capacity to serve its traffic, the capacity manager 206 may determine that an increase to the reserved capacity for the tunnel is required. Similarly, when a given tunnel has more than sufficient capacity, the capacity manager 206 may determine that a decrease to capacity of the given tunnel is required, so that other tunnels may claim the freed capacity. Again, to limit the frequency of changes to the reserved capacity, the capacity manager 206 does not request a decrease in the reserved capacity of the given tunnel as soon as $b_{total} < b_{res}$, but when $b_{total}$ is much smaller than $b_{res}$. The capacity manager 206 may consider a tunnel underutilized when the estimated total capacity requirement, $b_{total}$, falls below a low level, $v \cdot b_{res}$, where the low level indicator, v (<1−f), is set by the network administrator. In such a case, the capacity manager 206 may request that the tunnel signaler 210 reduce the reserved capacity for the given tunnel to $(1-f) \cdot b_{res}$, i.e. the buffer for traffic increase may be removed from the requested capacity, as the buffer is unnecessary for a lightly utilized tunnel. The network administrator may further decrease the frequency of capacity adjustments by imposing a minimum time between two consecutive capacity decreases.

At the path selector 208, there is a requirement for a method for selecting new paths (step 506, FIG. 5) at the request of the capacity manager 206. Note, however, that the decision as to whether a selected path is used for a tunnel is left to the capacity manager 206. If the present invention is applied to an existing network, it is preferable that the routing method of the existing network be used select new paths. If the present adaptive capacity management scheme is to be used in a new network, whichever routing method is chosen for the new network is preferably used by the path selector 208 to select new paths. The following provides two exemplary path selection methods, but as will be apparent to a person skilled in the art, it is not intended that the adaptive capacity management scheme be restricted to these path selection methods.

A first path selection algorithm is of use in networks wherein the network nodes inform other nodes of the capacity availability of their links, i.e. the amount capacity not reserved by tunnels. Each node in such a network sends capacity availability information to all other nodes in the network. This sending of capacity availability information may occur with a predetermined periodicity, or after the available capacity on a particular link changes significantly, i.e. by more than a threshold value. In such a network, the path selector at each node has a record of the capacity available in the entire network.

When the capacity manager 206 requests a path (step 506, FIG. 5), for a given existing tunnel, with available capacity of at least $b_{total}$, the path selector 208 may find such a path using the following algorithm. Initially, the path selector 208 may add the capacity currently reserved by the given tunnel, $b_{res}$, to the available capacity, $b_a$, on each link along a path currently used by the given tunnel. Both the value of $b_{res}$ and an indication of the current path are supplied to the path selector 208 by the capacity manager 206. The path selector 208 then assigns a metric to each link in the network. The value of the metric assigned to each link is $1 + 1/b_a$ if $b_a \geq b_{total}$ and infinity otherwise. The path selector 208 then determines the path through the network from the source of the current path with a smallest total metric. If the determined path has a finite total metric, it may be concluded that the determined path uses a minimum number of links and has sufficient available capacity for reservation for the given tunnel. If the determined path has an infinite metric, it may be concluded that a path with sufficient available capacity does not exist in the network.

One algorithm useful for determining a path with a smallest total metric was developed by Edsger Dijkstra in 1959. Dijkstra's algorithm is a well known method described in, for example, C. Papadimitriou, K. Steiglitz, (1982), *Combinatorial Optimization: Algorithms and Complexity*, Prentice-Hall, the contents of which are incorporated herein by reference. Using the algorithm, finding the shortest path (i.e., the path which minimises a metric) for travelling from a given vertex on a graph to every other vertex is possible. Dijkstra's algorithm takes, as its input, a graph with links, each weighted with a metric, and a given root vertex. In the case where the metric represents the cost of each link, the algorithm returns an indication of the least cost path from the root vertex to the particular vertex as well as the overall cost of the path.

Where a path with sufficient available capacity does not exist, the path selector 208 may use a modified version of an algorithm found in Z. Wang, J. Crowcroft, "Quality-of-Service Routing for Supporting Multimedia Applications", IEEE JSAC, vol. 14, no. 7, September 1996 to find a path with maximum available capacity (i.e. bandwidth). If there is more than one path with the maximum bandwidth, the following algorithm selects the path which has fewest hops.

Where s and d respectively denote the source and destination nodes of a given tunnel, each node, n, in the network may be assigned three parameters: available bandwidth B(n) over a maximum bandwidth path from s; numbers of hops H(n) in that maximum bandwidth path from s; and the node preceding node n, P(n), in that maximum bandwidth path from s. Initially, if there is a direct link from s to n with available bandwidth b(s, n)>0, then B(n)=b(s, n), H(n)=1 and P(n)=s. Otherwise, B(n)=0, $H_s(n)=\infty$ and P(n)=∞.

Figure 7:
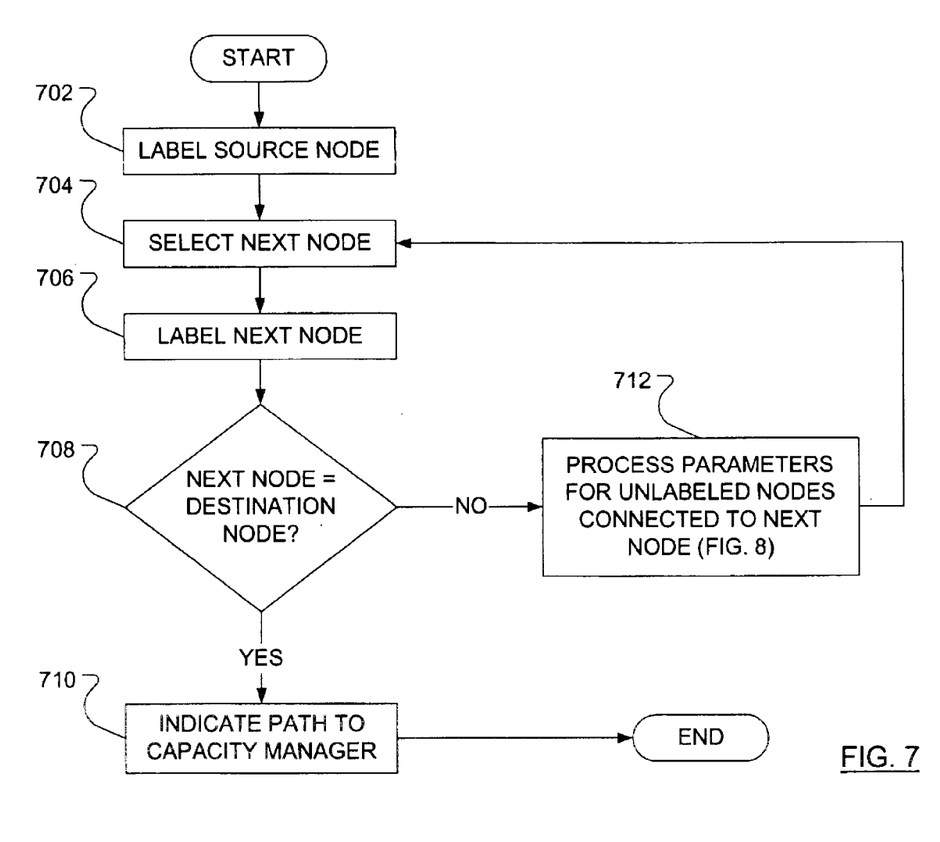
FIG. 7 illustrates a path selection method in accordance with an embodiment of the present invention.

The algorithm is illustrated in FIG. 7. Initially, the source node, s, is labeled (step 702). Subsequently, the unlabeled nodes are considered with regard to selecting a next node, $n_{next}$, having the greatest available bandwidth over a path from s, B(n) (step 704). If there is more than one node having the greatest B(n), the node with the least H(n) is selected as next node, $n_{next}$. Where more than one of the nodes having the greatest B(n) also have equivalent hop counts, one of these nodes is arbitrarily selected as next node, $n_{next}$. The next node $n_{next}$ is then labeled (step 706). If it is determined (step 708) that the selected next node is also the destination node (i.e. $n_{next}$=d), a path is considered to have been found and the found path may be indicated to the capacity manager 206 (step 710). The indicated path comprises the destination, d, its predecessor, P(d), its predecessor's predecessor, P(P(d)), and so on tracing a path back to the source, s. If $n_{next} \neq d$, then the value of the parameters are processed (step 712) for each unlabeled node, n, with a direct link to $n_{next}$, i.e. for which b($n_{next}$, n)>0.

Figure 8:
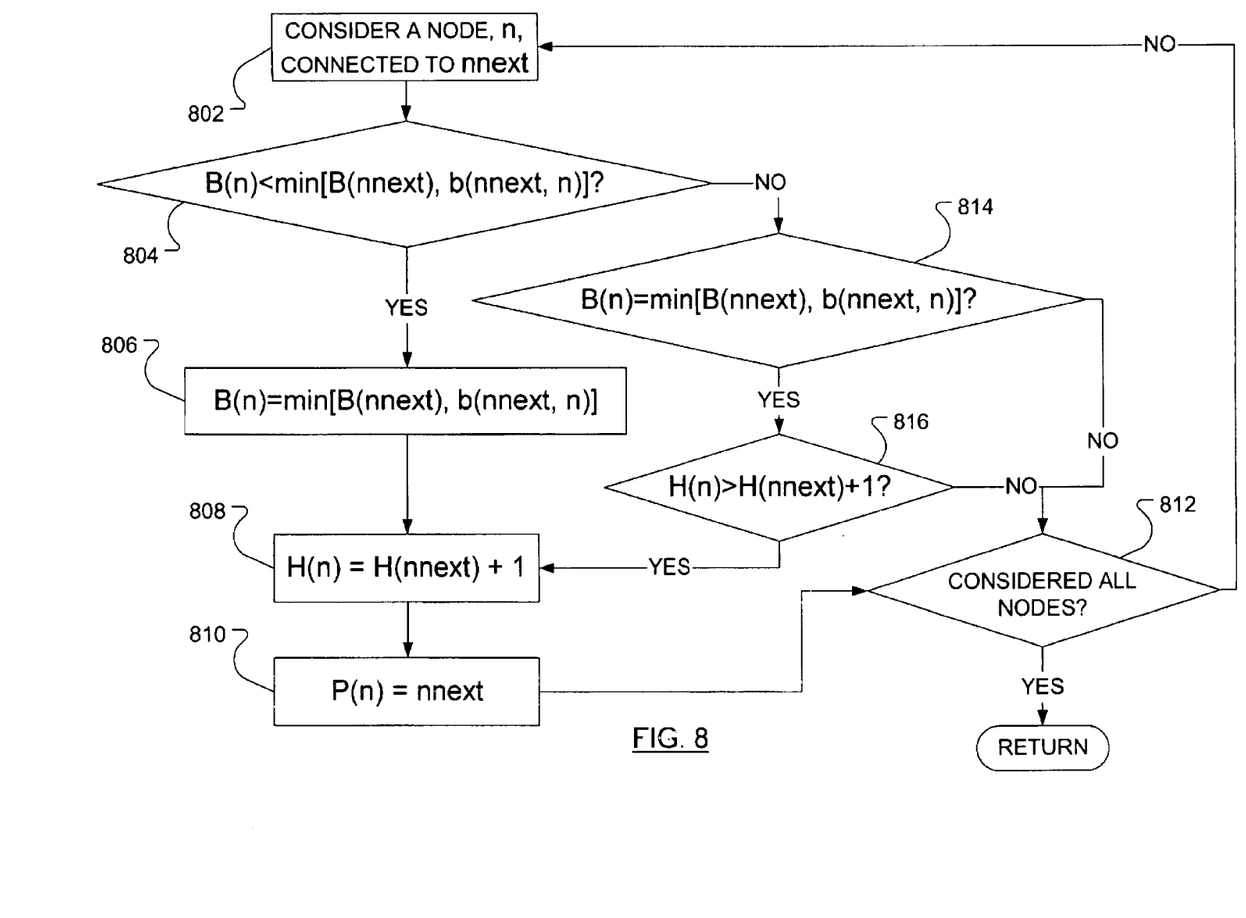
FIG. 8 illustrates a parameters processing method used in the method of FIG. 7 in accordance with an embodiment of the present invention.

The processing of parameters is illustrated in FIG. 8. Initially, an unlabeled node n, connected to the next node, is selected for consideration (step 802). If B(n)<min[B($n_{next}$), b($n_{next}$, n)] (step 804), then B(n) is reassigned to min[B ($n_{next}$), b($n_{next}$, n)] (step 806), the number of hops from the source is set such that H(n)=H($n_{next}$)+1 (step 808) and the predecessor is set such that P(n)=$n_{next}$ (step 810). If it is subsequently determined that there are nodes left to consider (step 812), the process begins again with the selection of another unlabeled node connected to the next node (step 802). Otherwise, the processing is complete. If B(n)≧min [B($n_{next}$), b($n_{next}$, n)] (step 804), then it is further determined whether B(n)=min[B($n_{next}$), b($n_{next}$, n)] (step 814). In the case of an equality in step 814, the node under consideration has been reached via an old path and the hop count is examined (step 816) to determine whether the new path, through $n_{next}$, is more efficient than the old path (i.e. has fewer hops). If the new path has fewer hops, the hop count is set such that H(n)=H($n_{next}$)+1 (step 808) and the predecessor is set such that P(n)=$n_{next}$ (step 810). If the old path is more efficient (step 816) or has greater bandwidth (step 814), then it is determined whether there are nodes left to consider (step 812).

A second path selection algorithm applies to networks wherein a network administrator, or a network management system, provides each node with a routing table, listing paths to each destination in the network. The routing table need not cover all the possible paths. A few paths, say five, per origin/destination pair will suffice. Those lists can be updated after significant changes to the network topology, or link utilization.

Upon receiving, from the capacity manager 206, a request for a path (step 506, FIG. 5), path selector 208 may check paths other than the tunnel path in the routing table for capacity availability. The path selector 208 returns to the capacity manager 206 the first path which has sufficient available capacity. If none of the paths on the list has sufficient available capacity, the path selector 208 may return, to the capacity manager 206, the path with the greatest available capacity.

In review then, there are at least three benefits to the present invention. First, the dynamism of the proposed system. The system acts in a near-real time mode, based on measurements and information exchange within and between network nodes 102. Second, although the capacity manager 206 and the path selector 208 make decisions locally, the decisions are based on the network-wide information and the decisions have network-wide consequences, i.e. tunnels selected, or modified, by the decisions change bandwidth allocation in the network links. Third, the system may be applied to all levels of a network, allowing for very fast and efficient bandwidth management, as compared to individual and independent bandwidth management at each level.

Other modifications will be apparent to those skilled in the art and, therefore, the invention is defined in the claims.

We claim:

1. A method for changing a reserved capacity for a given tunnel, comprising:

receiving an indication of traffic demand for a tunnel through a network;

based on said received indication, determining an estimated total capacity requirement;

comparing said estimated total capacity requirement to said reserved capacity;

where said estimated total capacity requirement exceeds said reserved capacity, requesting an increase of said reserved capacity;

determining whether a current path of said tunnel has sufficient available capacity to accommodate said estimated total capacity requirement, said current path having a source node and a destination node;

where said current path of said tunnel has sufficient available capacity to accommodate said increase, transmitting signaling to nodes along said current path to request said increase of said reserved capacity;

where said current path of said tunnel has insufficient available capacity to accommodate said increase, determining a plurality of paths through said network from said source node to said destination node, where each path of said plurality of paths has an associated available capacity; and selecting one path of said plurality of paths having sufficient associated available capacity to accommodate said estimated total capacity requirement.

2. The method of claim 1, further comprising:

transmitting signaling to nodes along said selected one path of said plurality of paths to request said estimated total capacity requirement; and moving said tunnel to said selected one of said plurality of paths.

3. A method for changing a reserved capacity for a given tunnel, comprising, receiving an indication of traffic demand for a tunnel through a network;

based on said received indication, determining an estimated total capacity requirement;

comparing said estimated total capacity requirement to said reserved capacity;

where said estimated total capacity requirement exceeds said reserved capacity, requesting an increase of said reserved capacity;

determining whether a current path of said tunnel has sufficient available capacity to accommodate said estimated total capacity requirement, said current path having a source node and a destination node;

where said current path of said tunnel has sufficient available capacity to accommodate said increase, transmitting signaling to nodes along said current path to request said increase of said reserved capacity;

where said current path of said tunnel has insufficient available capacity to accommodate said increase, determining a plurality of paths through said network from said source node to said destination node, where each path of said plurality of paths has an associated available capacity;

where said estimated total capacity requirement exceeds said associated available capacity of each of said plurality of paths, determining a limiting link in said current path, where said limiting link has a minimum available capacity among links in said current path; and communicating with a lower level network to request an increase of available capacity on said limiting link.

4. The method of claim 3 further comprising, where said request to said lower level network is accepted;

transmitting signaling to nodes along said current path to request said increase of said reserved capacity to said estimated total capacity requirement.

5. The method claim 3 further comprising, where said lower level network returns an available capacity of said limiting link and where said estimated total capacity requirement exceeds said available capacity of said limiting link, selecting one path of said plurality of paths having a maximum associated available capacity among said plurality of paths;

where said available capacity of said limiting link exceeds said associated available capacity of said selected one path of said plurality of paths;

transmitting signaling to nodes along said current path to request that said reserved capacity be increased to said available capacity of said limiting link.

6. The method of claim 3 further comprising, where said lower level network returns an available capacity of said limiting link and where said estimated total capacity requirement exceeds said available capacity of said limiting link, selecting one path of said plurality of paths having a maximum associated available capacity among said plurality of paths;

where said available capacity associated with said selected one path of said plurality of paths exceeds said available capacity of said limiting link;

transmitting signaling to nodes along said selected one of said plurality of paths to request said estimated total capacity requirement; and moving said tunnel to said selected one of said plurality of paths.

7. The method of claim 3 further comprising where said request to said lower level network is rejected:

selecting one path of said plurality of paths having a maximum associated available capacity among said plurality of paths;

transmitting signaling to nodes along said selected one of said plurality of paths to request said associated available capacity; and moving said tunnel to said selected one of said plurality of paths.

8. The method of claim 1 wherein said receiving said indication of traffic demand comprises:

receiving an indication of tunnel capacity in use by serviced requests; and receiving an indication of tunnel capacity refused admission to the tunnel.

9. The method of claim 1 wherein said requested increase of said reserved capacity comprises a difference between said reserved capacity and said estimated total capacity requirement.

10. The method of claim 1 wherein said requested increase of said reserved capacity comprises a difference between said reserved capacity and a sum of said estimated total capacity requirement and a buffer value.

11. A system for automated adjustment of a reserved capacity for a tunnel, said tunnel associated with a current path through a network, where along said current path are nodes and said current path has a source node and a destination node, said system comprising:

a tunnel signaler operable to transmit a capacity increase request to said nodes along said current path, said capacity increase request indicating a requested increase of said reserved capacity;

an admission controller;

a capacity manager operable to:

receive, from said admission controller, an indication of traffic demand for said tunnel;

determine an estimated total capacity requirement based in said received indication;

compare said estimated total capacity requirement to said reserved capacity; and responsive to determining through said comparing, that said estimated tunnel total capacity requirement exceeds said reserved capacity, instruct said tunnel signaler to transmit said capacity increase request; and a path selector operable to:

determine a plurality of paths through said network from said source node to said destination node, where each path of said plurality of paths has an associated available capacity; and select one path of said plurality of paths having sufficient associated available capacity to accommodate said estimated total capacity requirement.

* * * * *

UNITED STATES PATENT AND TRADEMARK OFFICE
CERTIFICATE OF CORRECTION

PATENT NO. : 6,842,463 B1
DATED : January 11, 2005
INVENTOR(S) : Drwiega et al.

It is certified that error appears in the above-identified patent and that said Letters Patent is hereby corrected as shown below:

Column 15,
Line 35, "The method claim 3" should read -- The method of claim 3 --.

Column 16,
Line 3, "further comprising where said" should read -- further comprising, where said --.
Line 46, "based in said" should read -- based on said --.
Line 49, "determining through" should read -- determining, through --.
Line 50, "estimated tunnel total capacity" should read -- estimated total capacity --.

Signed and Sealed this

Twenty-fifth Day of October, 2005

JON W. DUDAS
*Director of the United States Patent and Trademark Office*